United States Patent [19]

Turk

[11] 4,157,100
[45] Jun. 5, 1979

[54] THREAD PROTECTOR DEVICE

[76] Inventor: John Turk, 11433 Lansing Dr., Garfield Heights, Ohio 44125

[21] Appl. No.: 825,301

[22] Filed: Aug. 17, 1977

[51] Int. Cl.$^2$ ............................................. B65D 59/06
[52] U.S. Cl. .................. 138/96 T; 138/96 R
[58] Field of Search ................. 138/96 R, 96 T; 16/2, 16/108

[56] References Cited

U.S. PATENT DOCUMENTS

| | | | |
|---|---|---|---|
| Re. 21,394 | 3/1940 | Lytle | 138/96 T |
| 1,941,235 | 12/1933 | Unke | 138/96 T |
| 2,121,436 | 6/1938 | Lytle | 138/96 T |
| 2,156,169 | 4/1939 | Unke | 138/96 T |
| 2,195,530 | 4/1940 | Curtis | 138/96 T |
| 2,225,754 | 12/1940 | Mirfield | 138/96 T |
| 2,523,930 | 9/1950 | Unke | 138/96 T |
| 3,000,402 | 9/1961 | Bowman | 138/96 T |
| 4,020,873 | 5/1977 | Palarino | 138/96 T |

FOREIGN PATENT DOCUMENTS 664372 8/1938 Fed. Rep. of Germany ........ 138/96 R
219350 7/1924 United Kingdom .................. 138/96 T Primary Examiner—Richard E. Aegerter
Assistant Examiner—James E. Bryant, III
Attorney, Agent, or Firm—Fay and Sharpe

[57] ABSTRACT

A thread protector particularly adapted for protecting external pipe threads. The protector is comprised of a generally frusto-conical open ended metal outer shell which embraces and is affixed to a similarly formed plastic inner sleeve. Both the shell and sleeve include radially inward directed flanges at the protector inner end merging into lips which extend generally toward the protector outer end. The inner sleeve directly confronts the outer shell at the flange and lip areas but is spaced from the shell at the protector side wall areas by a plurality of spacing ribs. This spaced apart relationship between the shell and sleeve cushions blows which may be received against the protector after installation on a threaded member. The inner side wall surface of the sleeve is threaded from adjacent the outer end toward the inner end to facilitate convenient threaded mounting of the protector.

13 Claims, 4 Drawing Figures

THREAD PROTECTOR DEVICE

BACKGROUND OF THE INVENTION

This invention pertains to the art of protective devices and more particularly to a thread protecting device.

The invention is particularly applicable to a thread protector for protecting the external threads of tubing or pipe and, more particularly, to the external threads on tubing, casing and drill pipe used in the natural gas and oil industry. However, it will be appreciated to those skilled in the art that the invention could be readily adapted for use in other environments as, for example, where similar protective devices are employed to protect other types of fragile or destructible threaded areas.

Conventional tubing and pipe threads are generally V-shaped in cross-section. Because of the handling and storage techniques generally employed with tubing and pipe, the threads are often exposed to harsh treatment during manufacture, shipment and use. This can cause particular damage to the crests of the threads by way of nicks, indentations and deformations resulting in their being unuseable. Furthermore, the tubing, casing and drill pipe to which the subject invention is particularly directed are frequently stored for prolonged periods of time in severe and corrosive environments such as wet, salty sea air and/or hot and sandy desert locations. If not properly insulated from such harmful environments, any threaded areas may quickly become unserviceable.

Various forms and types of thread protectors have heretofore been suggested and employed in the industry, all with varying degrees of success. It has been found that the defects present in most prior thread protecting devices are such that the devices themselves are of limited economic and practical value.

Typically, these prior thread protectors have variously comprised cup-shaped members formed from relatively heavy plastics, metals or metal-plastic combinations.

Prior heavy plastic protectors have suffered a number of inherent problems. It has been found that prolonged storage or exposure to harsh weather will cause many such devices to become out-of-round. This makes it difficult to properly mount or start them on the tubing, thereby creating consequent loss of time. In these instances, customers have been faced with incurring a small additional labor cost due to the extra time required in such protector mounting operations. In addition, protectors of all plastic construction have not withstood the impacts and blows received in handling. For example, due to their elasticity, many prior designs permit protector "rub off" from the tubing during the reciprocative back and forth shifting experienced during transportation in gondolas and trucks. Furthermore, the sharp blows received in loading and unloading may pierce or cut the plastic and, consequently, damage the underlying threads. However, where the protector side walls have been made thicker to withstand such blows, they are of excessive and unmanageable physical dimensions which substantially inhibit the efficient storage, handling and transportation of the tubing.

Prior protectors of all metal construction have generally comprised steel stampings or heavy wall tapped steel. Due to the sharp edges that result from the methods of manufacture used, workers handling them are more prone to injury by cuts or nicks. In addition, metal protectors will not cushion any impact or sharp blows to the tubing and may transfer them to the threads thereby causing thread damage. A further problem with all metal protectors is that they permit metal-to-metal contact. In the aforementioned harsh environments, this may be ruinous as the protector may rust to the tubing. This problem may be avoided by applying grease to the protector and tubing threads, but this requires additional labor costs as well as material expense.

Generally, prior protectors of metal-plastic combination construction have comprised metal casings on plastic sleeves. Typical of such constructions is the one shown in U.S. Pat. No. 3,000,402 to Bowman. These types of devices have had particular problems associated therewith as the metal shells or casings have a tendency to become disengaged from the associated plastic sleeve due to axial forces encountered during tubing handling and transporting. This separation is chiefly due to the substantial difference between the outside diameter of the protector and the outside diameter of the tubing which results in a jutting protrusion normal to the surface of the tubing that has been particularly susceptible to receiving axial forces. An additional problem resides in the fact that the metal shells or casings have generally been friction-fitted to an associated sleeve. The harsh environments to which the tubing and protectors are exposed have caused variances in the physical dimensions of the protector components which has resulted in additional susceptibility for disengagement or separation thereof.

The present invention contemplates a new and improved device which overcomes all of the above referred to problems and others to provide a new thread protector which is simple in design, economical to manufacture, readily adaptable to a plurality of uses with threaded members having a variety of dimensional characteristics, easy to install, easy to remove and which provides improved insulation from weather and handling hazards.

BRIEF SUMMARY OF THE INVENTION

In accordance with the present invention, there is provided a thread protector particularly suited for protecting external threads on a threaded member such as pipe, pipe fitting threads and the like. The new protector is generally comprised of an open ended outer shell received in a cooperative relationship over an inner sleeve. Both the shell and sleeve have radially inward extending flanges at the protector inner end merging into lip areas which then extend generally toward the protector outer end. Means are provided for maintaining the shell and sleeve side walls in a spaced apart relationship from each other. The outer shell is positively mechanically affixed to the inner sleeve to maintain the cooperative relationship therebetween. The inner sleeve is threaded from adjacent the outer end toward the inner end to facilitate threaded mounting thereof on a hollow member.

In accordance with another aspect of the present invention, the flange and lip of the inner sleeve are configured and dimensioned to compressively abut the end of the hollow threaded member for creating a camming action therebetween as the protector is threadedly mounted thereon in order to create an improved protector seal.

In accordance with a further aspect of the present invention, longitudinally disposed impact absorbing ribs extend outwardly from the outer side wall surface of the inner sleeve for engagement by the inner side wall surface of the outer shell and maintain the desired spaced apart relationship therebetween.

In accordance with a more limited aspect of the present invention, the protector is tapered upwardly from the shell outer end toward the sleeve outer end for minimizing "rub off" problems.

In accordance with yet another more limited aspect of the present invention, the outer shell is constructed of metal and fixedly connected to the inner sleeve which is constructed from plastic by means of at least one impressed detent piercing the outer shell and penetrating into the inner sleeve.

One benefit obtained by use of the present invention is a thread protector which has the strength of an all metal protector but which does not have any metal-to-metal contact between the protector itself and the protected threads.

Another benefit obtained from the present invention is a thread protector which substantially reduces the problems of the protector becoming separated from the protected threads during handling and transportation.

A further benefit of the present invention is a thread protector which will absorb above average impacts and blows incident to tubing handling and transportation, yet maintain a proper seal to insulate the threads from harsh weather environments during long storage periods.

Other benefits and advantages for the subject new thread protector will become apparent to those skilled in the art upon a reading and understanding of this specification.

BRIEF DESCRIPTION OF THE DRAWINGS

The invention may take physical form in certain parts and arrangements of parts, the preferred and an alternative embodiment of which will be described in detail in this specification and illustrated in the accompanying drawings which form a part hereof and wherein:

FIG. 1 is a perspective view of a thread protector formed in accordance with the present invention showing it in position on a threaded tube, pipe, casing or the like;

DETAILED DESCRIPTION OF THE INVENTION

Figure 1:
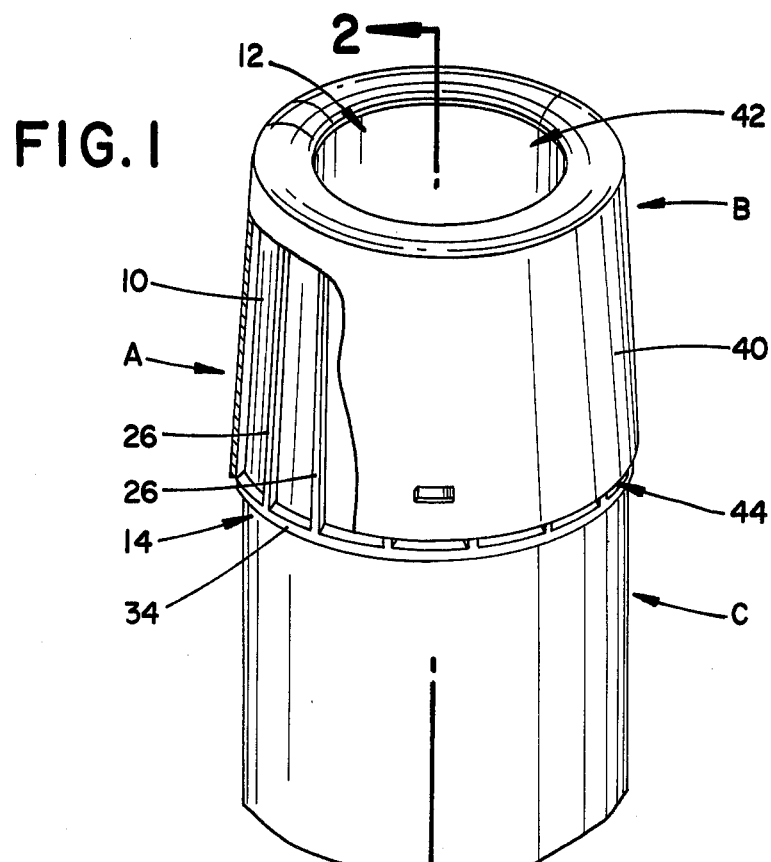

Referring now to the drawings wherein the showings are for purposes of illustrating the preferred and one alternative embodiment of the invention only and not for purposes of limiting same, the FIGURES show a thread protector device comprised of an inner sleeve A and an outer shell B and which protector is received on a threaded tube, pipe, casing or the like generally designated C.

Figures 2, 3, 4:
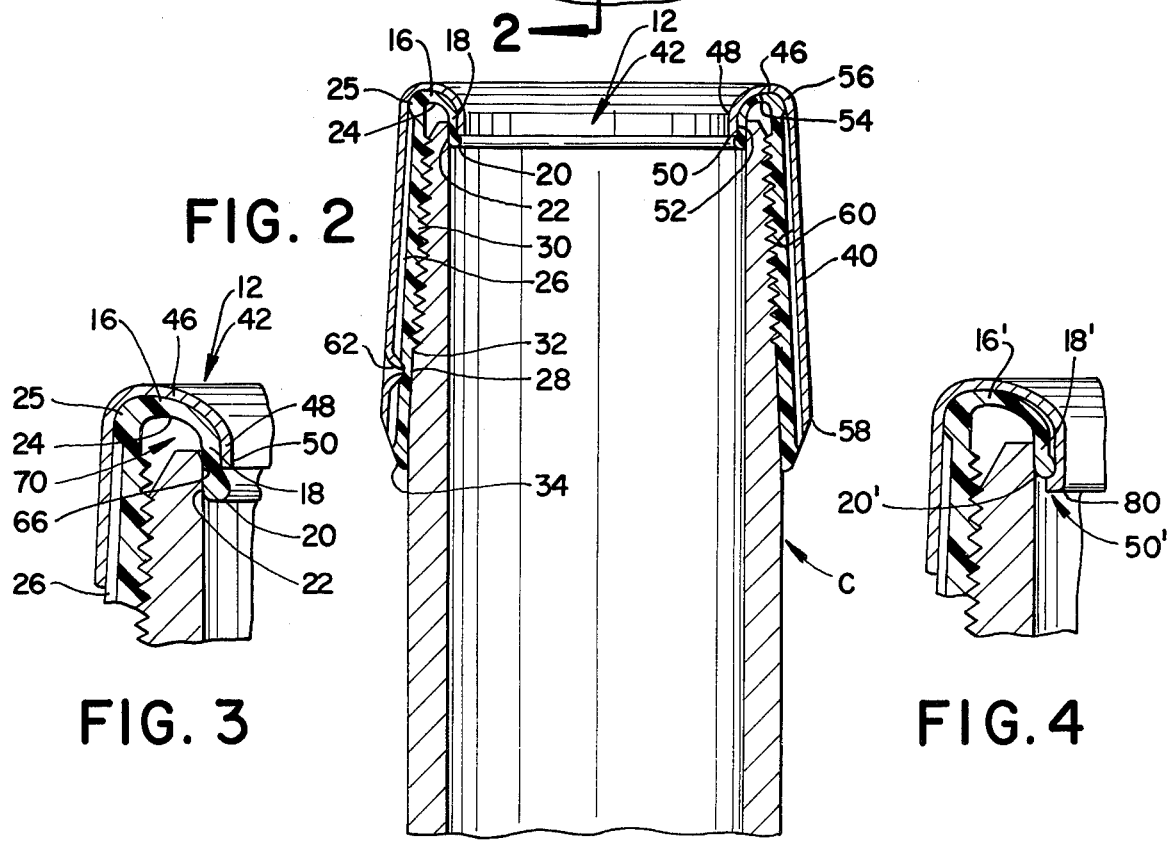
FIG. 2 is a cross-sectional view taken along line 2—2 of FIG. 1.
FIG. 3 is an enlarged, partial cross-sectional view particularly showing the configuration of one portion of the protector flange and lip areas, including their engagement with a threaded member; and, FIG. 4 is an enlarged, partial cross-sectional view particularly showing the configuration of one portion of an alternative embodiment for the protector flange and lip areas, including the engagement thereof with a threaded member.

More specifically and with reference to FIGS. 1 and 2, inner sleeve A has a generally frusto-conical configuration comprised of a continuous side wall 10, an open inner end 12 and an open outer end 14. Sleeve A may be constructed from any number of resilient, impact-absorbing, non-metallic materials. Preferably, however, commercially available high-density polyethylene is employed.

At inner end 12, the sleeve has a generally radially inward extending annular flange 16 which merges into a lip 18 extending further inward and toward outer end 14. Lip 18 extends to an innermost peripheral edge 20 and has an inner surface 22 of a lesser diameter than the diameter of inner surface 24 of said flange 16. The flange is joined with side wall 10 at a generally rounded rim area 25. The lateral dimension between the inside surface of the sleeve side wall adjacent rim area 25 and lip inner surface 22 is such that the lip will cammingly engage the forward most end of threaded tube C. This dimension is such that the protector will closely cooperate with the inside and outside surfaces of the tube side wall at the forward most end in a manner to be more fully described hereinafter.

Extending generally longitudinally along the length of the outer surface of side wall 10 are a plurality of impact-absorbing, radially outward directed ribs 26. These ribs extend flush from the outer surface of rim 25 to the tapered edge 34 at sleeve outer end 14 and diminish in radial dimension to the extent that they are also flush with the outer surface of edge 34. The inner surface 28 of side wall 10 includes a threaded area 30 from adjacent outer end 14 toward inner end 12 for receiving threaded member C. As best seen in FIG. 2, threaded area 30 begins at area 32 longitudinally spaced from the outer end and extends to closely adjacent rim 25. The threads themselves are adapted to permit threaded receipt of a conventionally threaded tube, pipe or casing and which are threads most usually tapered inwardly toward the tubing end as shown in the FIGURES. Tapered bottom edge 34 allows the sleeve to closely receive tubing C and not be susceptible to damage or accidental rub-off by axial forces acting on a radially protruding surface.

Outer shell B has a frusto-conical configuration similar to that of sleeve A and includes a continuous side wall 40, an open inner end 42 and an open outer end 44. Shell B may be constructed of any strong and lightweight metal, such as aluminum or various kinds of steel. Preferably, however, 18 gauge galvanized steel is advantageously employed.

At inner end 12, the outer shell includes a radially inward extending annular flange 46 merging into a lip 48 which extends further inwardly and toward outer end 44. This lip then terminates at an innermost peripheral edge 50. Flange 46 and lip 48 are dimensiond to closely receive and matably abut sleeve flange 16 and lip 18, but shell edge 50 does not extend past sleeve edge 20. This relationship avoids any possibility of metal-to-metal contact between shell B and tubing C.

Lip 48 has an inner surface 52 of lesser diameter than the diameter of the inner surface 54 of flange 46. Flange 46 is joined with side wall 40 at a rounded, rim area 56. The inner surface 60 of wall 40 engages sleeve longitudinal ribs 26 when the sleeve and shell are properly positioned relative to each other. The edge 58 of the shell at outer end 44 is tapered somewhat in order that the shell will closely abut sleeve bottom edge 34 and to similarly eliminate the susceptibility to axial forces which could cause separation or damage. Edge 58 tapers into sleeve edge 34 and does not extend past sleeve bottom edge 34 to avoid any metal-to-metal contact with the threaded member.

Shell B, again, is dimensioned to closely receive sleeve A. For improved interlocking engagement strength between the shell and sleeve, at least one mechanically fitted detent 62 pierces the shell and extends into the sleeve from the side wall outer surface. This detent may take any number of different forms and be placed at any point on the thread protector by any number of known means. In the preferred embodiment, however, the detent employed has a generally rectangular configuration. Moreover, this detent is positioned so that it is longitudinally outward of threaded area 30 opposite area 32 so as not to cause any thread damage.

OPERATION

With particular attention to FIG. 3, the improved sealing and impact absorbing characteristics of the new thread protector will be specifically discussed.

The invention has a double locking and sealing nature: the thread-to-thread seal and the sleeve flange and lip to tubing seal. With particular attention to the sleeve flange and lip seal, the diameter of inner surface 22 of sleeve lip 18 at some point is slightly greater than the inner diameter of the tubing C at its inner edge 66 due to the structural arrangement described above. Therefore, as the thread protector is threadedly advanced onto the tubing, sleeve flange 16 and lip 18 will not freely pass into the top inner end of the tubing. Rather, inner surface 22 of lip 18 will compressively abut tubing top inner edge 66 before the tubing bottoms out against inner surface 24 of sleeve flange 16.

Due to the resilient nature of the plastic inner sleeve A, the sleeve flange and lip will give way and slide over the tubing edge 66 as increased torque is applied to the thread protector in advancing it onto the tube. A camming action between said sleeve flange and lip and the edge of the tubing consequently occurs. This camming action is important in that apart from providing a water and air-tight seal, improved impact absorbing characteristics are obtained through an air gap 70 defined between the innermost tubing end and inner surface 24 of the sleeve flange. As increased torque is applied to the protector, and the protector is further advanced onto the tubing, this air gap may be reduced. Simultaneously with such reduction, the abutment at tubing edge 66 proportionately increases in compressive force to consequently yield a tighter seal. The protector may be threadedly advanced until tubing C bottoms-out with the tubing end closely abutting sleeve flange inner surface 24 to provide a maximum tightness seal.

It will also be seen by one skilled in the art that as the camming engagement at the end of the tubing increases in compressive force, the thread-to-thread sealing force between the tubing and the protector also increases.

With particular attention to FIG. 4, an alternate embodiment of the invention is there shown. Like components are identified by like numerals with the addition of a primed (') suffix and new components are identified by new numerals. Here, a portion 80 of shell lip edge 50' extends beyond the terminal edge of sleeve lip edge 20'. This design adds improved protection of the sleeve flange 16' and lip 18'. However, portion 80 of the shell is configured to be spaced or offset from the outer surface of the tubing to avoid any metal-to-metal contact therewith.

The invention has been described with reference to the preferred embodiment. Obviously, modifications and alterations will occur to others upon the reading and understanding of the specification. It is my intention to include all such modifications and alterations insofar as they come within the scope of the appended claims or the equivalents thereof.

Having thus described my invention, I now claim:

1. A thread protector for protecting a generally cylindrical hollow member externally threaded from one end over a portion thereof and wherein said member has inner and outer diameters, said thread protector comprising:

an inner sleeve constructed from a resilient material to have a continuous sleeve side wall and open inner and outer ends with the inner surface of said sleeve side wall having a threaded area extending from at least adjacent said sleeve outer end toward said sleeve inner end adapted to threadedly receive at least a portion of the externally threaded area of said member, said sleeve including an annular flange adjacent said sleeve inner end extending generally radially inward from said sleeve side wall and merging into an annular lip which extends from the area of merger to a terminal edge disposed generally further radially inward and toward said sleeve outer end, said sleeve flange and lip being dimensioned so that at least some portion of said sleeve lip between the area of merger with said sleeve flange and lip terminal edge is adapted to engage said member one end as said member is threadedly received in said sleeve and said sleeve lip is adapted to cammingly engage the inside surface of said member one end as said member is further threadedly received in said sleeve to a position where at least said lip engages said inside surface of said member for compressingly engaging and sealing said member one end;

an outer shell received over said sleeve constructed from a material having a greater rigidity than said resilient material to have a continuous shell side wall and open inner and outer ends, said shell being dimensioned so that at least a substantial portion of the shell side wall inner surface is spaced from the sleeve side wall outer surface over the coextensive portions thereof, said shell including a shell flange disposed in an abutting covering relationship with said sleeve flange and merging into a shell lip disposed in an abutting covering relationship with said sleeve lip, said shell lip is adapted to bolster said sleeve lip as said sleeve lip cammingly engages said member one end;

means disposed between the sleeve and shell side walls for maintaining the spaced apart relationship therebetween and for cushioning said sleeve against the effects of blows imparted to said shell; and, means for fixedly retaining said shell on said sleeve.

2. The thread protector as defined in claim 1 wherein said retaining means comprises a rectangular shaped detent in said shell extending into a penetrating relationship with at least the outer surface of said sleeve side wall.

3. The thread protector as defined in claim 1 wherein said maintaining means comprises a plurality of ribs disposed at spaced intervals around the periphery of said sleeve side wall outer surface to extend substantially over the longitudinal dimension thereof between said sleeve inner and outer ends.

4. The thread protector as defined in claim 3 wherein said sleeve and said ribs are integrally formed with each other from a resilient plastic material and said shell is constructed of metal.

5. The thread protector as defined in claim 4 wherein said shell and sleeve outer ends are generally coextensive with each other, said shell outer end being spaced slightly from said sleeve outer end toward said sleeve inner end to prevent said metal outer shell from contacting said member when said member is threadedly received in said sleeve.

6. The thread protector as defined in claim 5 wherein a portion of said shell side wall adjacent said shell outer end tapers inwardly from the shell side wall outer face toward said sleeve outer end and wherein a portion of said sleeve also tapers inwardly in the same direction from said sleeve side wall outer face adjacent said sleeve outer end whereby the distance said thread protector is spaced outward from said member in a direction generally normal thereto adjacent said shell and sleeve outer ends is reduced.

7. The thread protector as defined in claim 1 wherein said shell lip terminal edge extends beyond said sleeve lip terminal edge in a covering relationship therewith and adapted to be spaced from the inside surface of said member when said member is threadedly received in said sleeve.

8. A thread protector for protecting a generally cylindrical hollow member having a tapered threaded area externally from one end thereof and wherein said member has inner and outer diameters, said thread protector comprising:

an inner sleeve constructed from a resilient plastic material to have a continuous sleeve side wall and open inner and outer ends with at least the inner surface of said sleeve side wall having a frusto-conical configuration and a threaded area extending from at least a portion of the tapered externally threaded area of said member, said sleeve including an annular flange adjacent said sleeve inner end extending generally radially inward from said sleeve side wall and merging into an annular lip which extends from the area of merger to a terminal edge disposed generally further radially inward and toward said sleeve open outer end, said sleeve flange and lip being dimensioned so that at least some portion of said sleeve lip between the area of merger with said sleeve flange and lip terminal edge is adapted to engage said member one end as said member is threadedly received in said sleeve and said sleeve lip is adapted to cammingly engage the inside surface of said member one end as said member is further threadedly received in said sleeve to a position where at least said lip engages said inside surface of said member for at least radially compressingly engaging and sealing said member one end;

an outer shell received over said sleeve constructed from metal to have a continuous shell side wall and open inner and outer ends, said shell being dimensioned so that at least a substantial portion of the shell side wall inner surface is spaced from the sleeve side wall outer surface over the coextensive portions thereof, said shell including a shell flange disposed in an abutting covering relationship with said sleeve flange and merging into a shell lip disposed in an abutting covering relationship with said sleeve lip, said shell lip is adapted to bolster said sleeve lip as said sleeve lip cammingly engages said member one end;

a plurality of peripherally spaced longitudinal ribs extending along and integral with said sleeve side wall outer surface for maintaining the spaced apart relationship between said shell and sleeve and for cushioning said sleeve against the effects of blows imparted to said shell; and, means for fixedly retaining said shell on said sleeve.

9. The thread protector as defined in claim 8 wherein said retaining means comprises a rectangular shaped detent in said shell extending into a penetrating relationship with at least the outer surface of said sleeve side wall.

10. The thread protector as defined in claim 8 wherein both said metal shell and plastic sleeve are thin walled and have frusto-conical configurations from their outer ends toward the inner ends.

11. The thread protector as defined in claim 10 wherein said shell and sleeve outer ends are generally coextensive with each other, said shell outer end being spaced slightly from said sleeve outer end toward said sleeve inner end to prevent said metal outer shell from contacting said member when said member is threadedly received in said sleeve.

12. The thread protector as defined in claim 11 wherein a portion of said shell side wall adjacent said shell outer end tapers inwardly from the shell side wall outer face toward said sleeve outer end and wherein a portion of said sleeve also tapers inwardly in the same direction from said sleeve side wall outer face adjacent said sleeve outer end whereby the distance said tapered outer end of the shell and sleeve of the thread protector is spaced outwardly from said member in a direction generally normal thereto adjacent said shell and sleeve outer ends is reduced.

13. The thread protector as defined in claim 8 wherein said shell lip terminal edge extends beyond said sleeve lip terminal edge in a covering relationship therewith and adapted to be spaced from the inside surface of said member when said member is threadedly received in said sleeve.

* * * * *